US008402642B2

(12) United States Patent
Kujuro et al.

(10) Patent No.: US 8,402,642 B2
(45) Date of Patent: Mar. 26, 2013

(54) POCKET COIL SPRING STRUCTURE ASSEMBLING APPARATUS

(75) Inventors: Toshinori Kujuro, Sasebo (JP); Hiroyuki Etoh, Machida (JP)

(73) Assignee: Matsushita Industrial Co., Ltd., Osaka (JP)

( * ) Notice: Subject to any disclaimer, the term of this patent is extended or adjusted under 35 U.S.C. 154(b) by 267 days.

(21) Appl. No.: 12/877,389

(22) Filed: Sep. 8, 2010

(65) Prior Publication Data

US 2011/0154653 A1 Jun. 30, 2011

(30) Foreign Application Priority Data

Sep. 9, 2009 (JP) ................................ 2009-208142

(51) Int. Cl.
*B23B 31/00* (2006.01)
*B65B 9/06* (2012.01)

(52) U.S. Cl. .............. 29/795; 29/33; 156/264; 156/292; 156/296; 156/512; 156/517; 156/529; 156/548; 156/558; 156/563; 156/566; 156/569

(58) Field of Classification Search .................... 29/795, 29/33
See application file for complete search history.

(56) References Cited

U.S. PATENT DOCUMENTS

| | | | | | |
|---|---|---|---|---|---|
| 4,566,926 | A | * | 1/1986 | Stumpf | 156/165 |
| 5,444,905 | A | * | 8/1995 | St. Clair | 29/564.7 |
| 5,740,597 | A | * | 4/1998 | Eto | 29/33 E |
| 5,792,309 | A | * | 8/1998 | Eto | 156/517 |
| 5,885,407 | A | * | 3/1999 | Mossbeck | 156/558 |
| 5,988,253 | A | * | 11/1999 | Eto | 156/578 |
| 6,119,322 | A | * | 9/2000 | Eto | 29/33 E |
| 6,430,982 | B2 | * | 8/2002 | Andrea et al. | 72/134 |
| 6,574,811 | B1 | * | 6/2003 | Mossbeck | 5/655.8 |
| 2008/0110574 | A1 | * | 5/2008 | Etoh | 156/516 |

* cited by examiner

*Primary Examiner* — Derris Banks
*Assistant Examiner* — Anthony Green
(74) *Attorney, Agent, or Firm* — Wenderoth, Lind & Ponack, L.L.P.

(57) ABSTRACT

In a pocket coil spring structure assembling apparatus, a row-of-pocket-coil-springs auxiliary feed stock mechanism and a row-of-pocket-coil-springs delivery mechanism are connected together in series so as to form a row-of-pocket-coil-springs supply unit, a plurality of row-of-pocket-coil-springs supply units are disposed on an upstream side with respect to a sealing/cutting mechanism, a control apparatus is allowed to alternatively select a row-of-pocket-coil-springs supply unit to face the sealing/cutting mechanism from the plurality of row-of-pocket-coil-springs supply units, and a row-of-pocket-coil-springs supply unit alternatively selected is moved to face the sealing/cutting mechanism.

9 Claims, 10 Drawing Sheets

POCKET COIL SPRING STRUCTURE ASSEMBLING APPARATUS

FIELD OF THE INVENTION

This invention relates to a pocket coil spring structure assembling apparatus that joins together rows of pocket coil springs that are used in a state of being mounted in an article of furniture, such as a chair or a sofa, or in an article of bedding, such as a bed mattress, and assembles these pocket coil springs efficiently like a mat.

BACKGROUND ART

As disclosed in U.S. Pat. No. 5,792,309, this kind of pocket coil spring structure assembling apparatus includes an auxiliary feed stock mechanism that supplies a row of pocket coil springs stocked on an upstream side of a pocket coil spring structure assembling apparatus, a delivery mechanism that sends the row of pocket coil springs supplied thereby to a sealing/cutting mechanism following the delivery mechanism, and the sealing/cutting mechanism, and these mechanisms are integrally formed in series.

Therefore, in the thus structured apparatus, if all the row of pocket coil springs in the auxiliary feed stock mechanism that is one component of the apparatus are used up, the operation of the pocket coil spring structure assembling apparatus is temporarily stopped, and the mechanism is replenished with another row of pocket coil springs, and then the pocket coil spring structure assembling apparatus is again operated.

Therefore, in the thus structured apparatus, the stop time of the pocket coil spring structure assembling apparatus is increased, and, disadvantageously, productivity is lowered in proportion to an increase in the stop time.

Additionally, in recent years, for example, a bed has improved its comfortability by partially changing the resilient force of a bed surface so as to suit the body of a user.

In order to partially change the resilient force of the bed surface in this way, the wire diameter of each spring or the number of spirals of each coil of the row of pocket coil springs is commonly changed. Likewise, in such a case, the stop time of the pocket coil spring structure assembling apparatus is increased to exchange the row of pocket coil springs for another, and, disadvantageously, productivity is lowered in proportion to an increase in the stop time.

SUMMARY OF THE INVENTION

The present invention has been made in consideration of these problems, and it is an object of the present invention to provide a pocket coil spring structure assembling apparatus that has high productivity while making the stop time of the pocket coil spring structure assembling apparatus as short as possible by simply performing the replenishment or the exchange of a row of pocket coil springs in a short time without consuming much time.

To achieve the above-mentioned object, the pocket coil spring structure assembling apparatus according to the present invention is a pocket coil spring structure assembling apparatus that assembles a plurality of rows of pocket coil springs into a mat-like pocket coil spring structure such that one coil spring is contained in one pocket that is made of sheet material, such as a nonwoven fabric, having air permeability and that is formed in a continuous cylindrical shape like a pocket, thereafter a row of pocket coil springs are successively arranged in a row, and a plurality of rows of pocket coil springs are bonded together. The pocket coil spring structure assembling apparatus is principally characterized by including a row-of-pocket-coil-springs auxiliary feed stock mechanism, a row-of-pocket-coil-springs delivery mechanism that is provided to deliver a predetermined number of a row of pocket coil springs, a sealing/cutting mechanism that seals and separates a row of pocket coil springs that have been delivered from the row-of-pocket-coil-springs delivery mechanism and that have a predetermined length, a row-of-pocket-coil-springs conveying mechanism that conveys a row of pocket coil springs that have been cut to a predetermined position, a melt application mechanism that applies an adhesive to a row of pocket coil springs, a pressure bonding mechanism that presses a next row of pocket coil springs conveyed by the row-of-pocket-coil-springs conveying mechanism against the row of pocket coil springs to which an adhesive has been applied, an applicator mechanism that supplies an adhesive to the melt application mechanism, and a control apparatus that controls each of the mechanisms. The pocket coil spring structure assembling apparatus is principally characterized in that the row-of-pocket-coil-springs auxiliary feed stock mechanism and the row-of-pocket-coil-springs delivery mechanism are connected together in series so as to form a plurality of row-of-pocket-coil-springs supply units, the plurality of row-of-pocket-coil-springs supply units are disposed on an upstream side with respect to the sealing/cutting mechanism, the control apparatus alternatively selects a row-of-pocket-coil-springs supply unit to face the sealing/cutting mechanism from among the plurality of row-of-pocket-coil-springs supply units, and the row-of-pocket-coil-springs supply unit alternatively selected is moved to face the sealing/cutting mechanism.

The pocket coil spring structure assembling apparatus according to the present invention is further characterized in that a stock space in the row-of-pocket-coil-springs auxiliary feed stock mechanism is structured so as to stock a row of pocket coil springs having a greater length than a row of pocket coil springs having at least a length processed by the pressure bonding mechanism, characterized in that a wire fillet is disposed on a row-of-pocket-coil-springs contact surface of an auxiliary feed roller of the row-of-pocket-coil-springs auxiliary feed stock mechanism, and characterized in that a shape of a U groove of a feed cam of the row-of-pocket-coil-springs delivery mechanism is formed in a dual-partitioning shape having substantially the same diameter as a body diameter of a pocket coil spring.

The pocket coil spring structure assembling apparatus according to the present invention is further characterized in that a horn and an anvil for ultrasonic welding of a sealing/cutting means are structured to be raised and lowered by about ½ or more of the body diameter of a coil spring, characterized in that the anvil for ultrasonic welding of the sealing/cutting means is divided into two parts, and is laid in a state in which a cutter knife can move through a center between the divided two parts, and characterized in that the row-of-pocket-coil-springs delivery mechanism is structured to convey a row of pocket coil springs to a predetermined position while interposing the row of pocket coil springs between a pair of conveying belts in a state of making a central axis of the pocket coil springs horizontal.

The pocket coil spring structure assembling apparatus according to the present invention is further characterized in that the hot melt applying mechanism is structured to move and apply a hot melt onto an upper surface of a row of pocket coil springs held by a pair of holding plates while a coating head used to apply a hot melt is moved and lowered from a standby position to the upper surface of the row of pocket coil springs held by the holding plates, and characterized in that the pressure bonding mechanism is structured to press a row of pocket coil springs conveyed by a conveying belt of the row-of-pocket-coil-springs conveying mechanism onto the row of pocket coil springs that have already been held by the holding plates.

According to the pocket coil spring structure assembling apparatus of the present invention, the plurality of row-of-pocket-coil-springs supply units formed by connecting the row-of-pocket-coil-springs auxiliary feed stock mechanism and the row-of-pocket-coil-springs delivery mechanism together in series are disposed on the upstream side with respect to the sealing/cutting mechanism, and the control apparatus alternatively selects a row-of-pocket-coil-springs supply unit to face the sealing/cutting mechanism, and the row-of-pocket-coil-springs supply unit alternatively selected is moved to face the sealing/cutting mechanism.

Accordingly, if a row of pocket coil springs in the auxiliary feed stock mechanism become insufficient and hence the auxiliary feed stock mechanism is replenished with other pocket coil springs or if a resilient force of the surface of, for example, a bed is partially changed in order to improve comfortability by partially changing a resilient force of its surface, what is required is merely to move a row-of-pocket-coil-springs supply unit selected from among a plurality of row-of-pocket-coil-springs supply units so as to face the sealing/cutting mechanism, and therefore, advantageously, it is possible to easily deal therewith in a short time, and the stop time of the pocket coil spring structure assembling apparatus can be made as short as possible, and its productivity can be greatly improved.

DETAILED DESCRIPTION OF THE INVENTION

A most preferred embodiment of a pocket coil spring structure assembling apparatus according to the present invention will be described with reference to the attached drawings.

Figure 1:
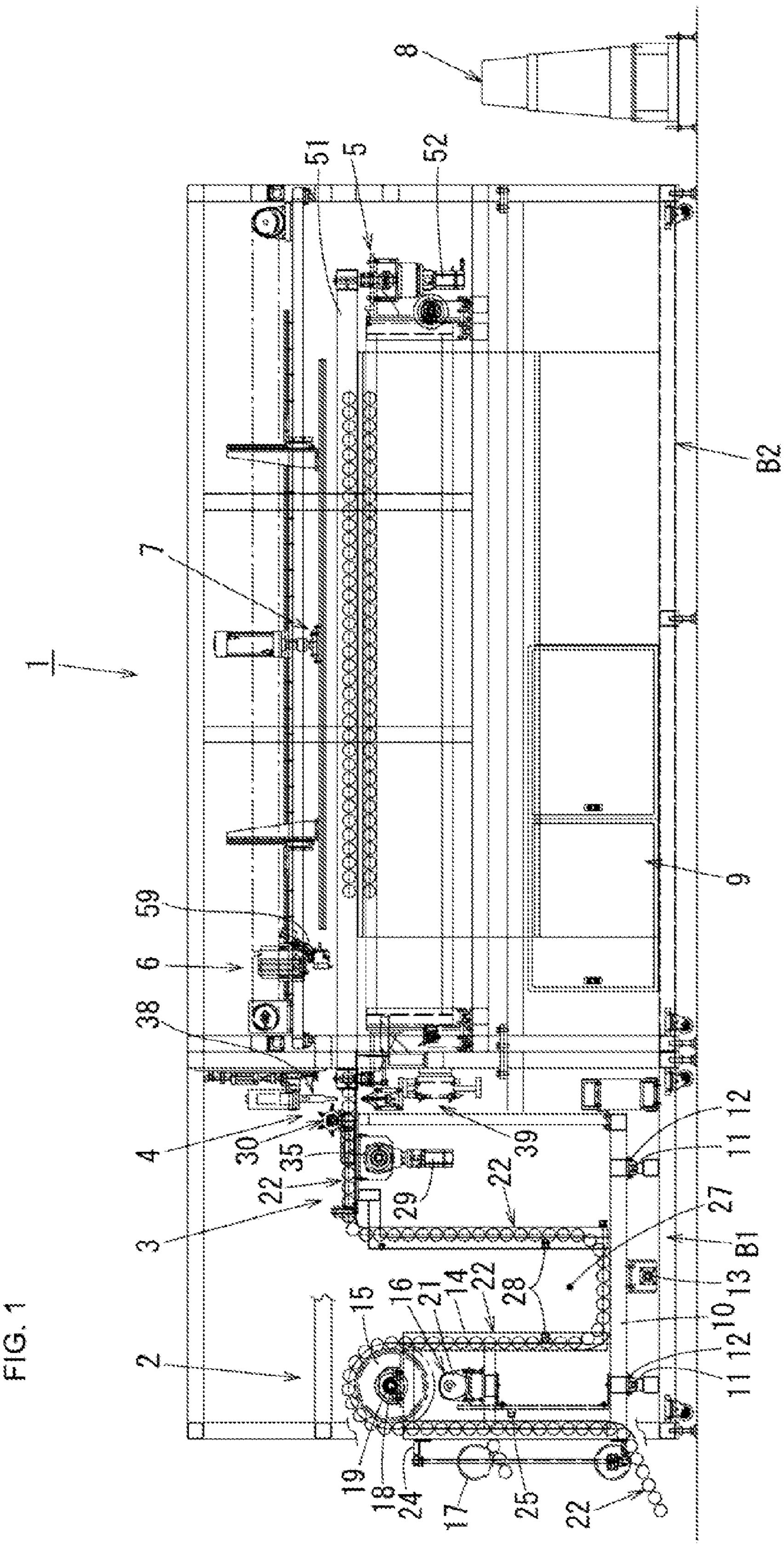
FIG. 1 is a front view showing the outline of the whole of a pocket coil spring structure assembling apparatus according to the present invention.

FIG. 1 is a front view showing the outline of the pocket coil spring structure assembling apparatus. In FIG. 1, reference numeral 1 designates the entire outline of the pocket coil spring structure assembling apparatus, reference numeral 2 designates a row-of-pocket-coil-springs auxiliary feed stock mechanism, reference numeral 3 designates a row-of-pocket-coil-springs delivery mechanism, reference numeral 4 designates a sealing/cutting mechanism, reference numeral 5 designates a row-of-pocket-coil-springs conveying mechanism, reference numeral 6 designates a melt application mechanism, reference numeral 7 designates a pressure bonding mechanism, reference numeral 8 designates an applicator, and reference numeral 9 designates a control apparatus.

The row-of-pocket-coil-springs auxiliary feed stock mechanism 2, the row-of-pocket-coil-springs delivery mechanism 3, and the sealing/cutting mechanism 4 are mounted in a first base frame B1 formed like a frame by use of shape steel, whereas the row-of-pocket-coil-springs conveying mechanism 5, the melt application mechanism 6, the pressure bonding mechanism 7, and the control apparatus 9 are mounted in a second base frame B2 formed like a frame by use of shape steel. The first base frame B1 and the second base frame B2 are disposed in a state of being connected together in series.

The applicator 8 is placed beside the second base frame B2.

Figure 2:
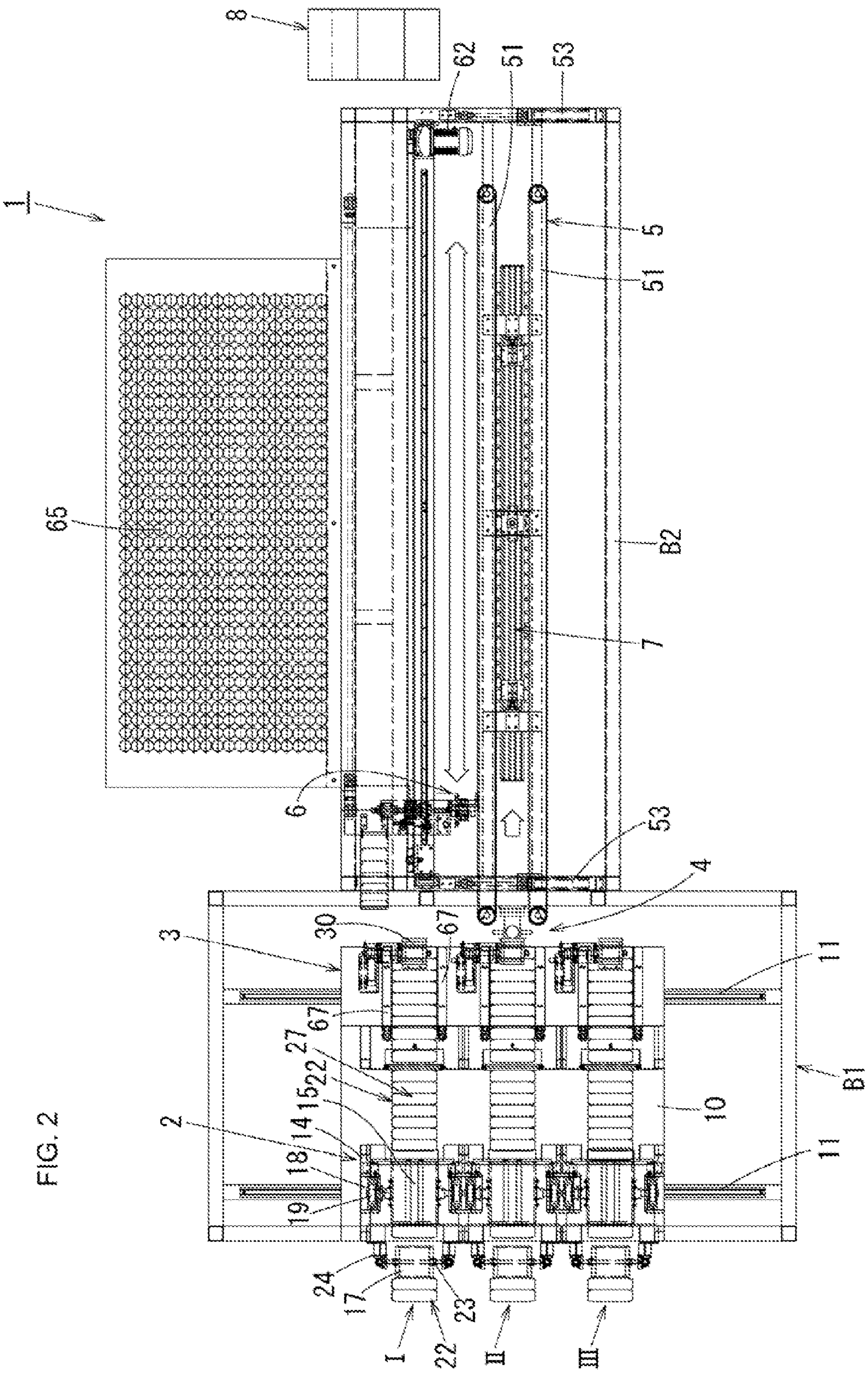
FIG. 2 is a top view showing the outline of the whole of the pocket coil spring structure assembling apparatus according to the present invention.
Figure 3:
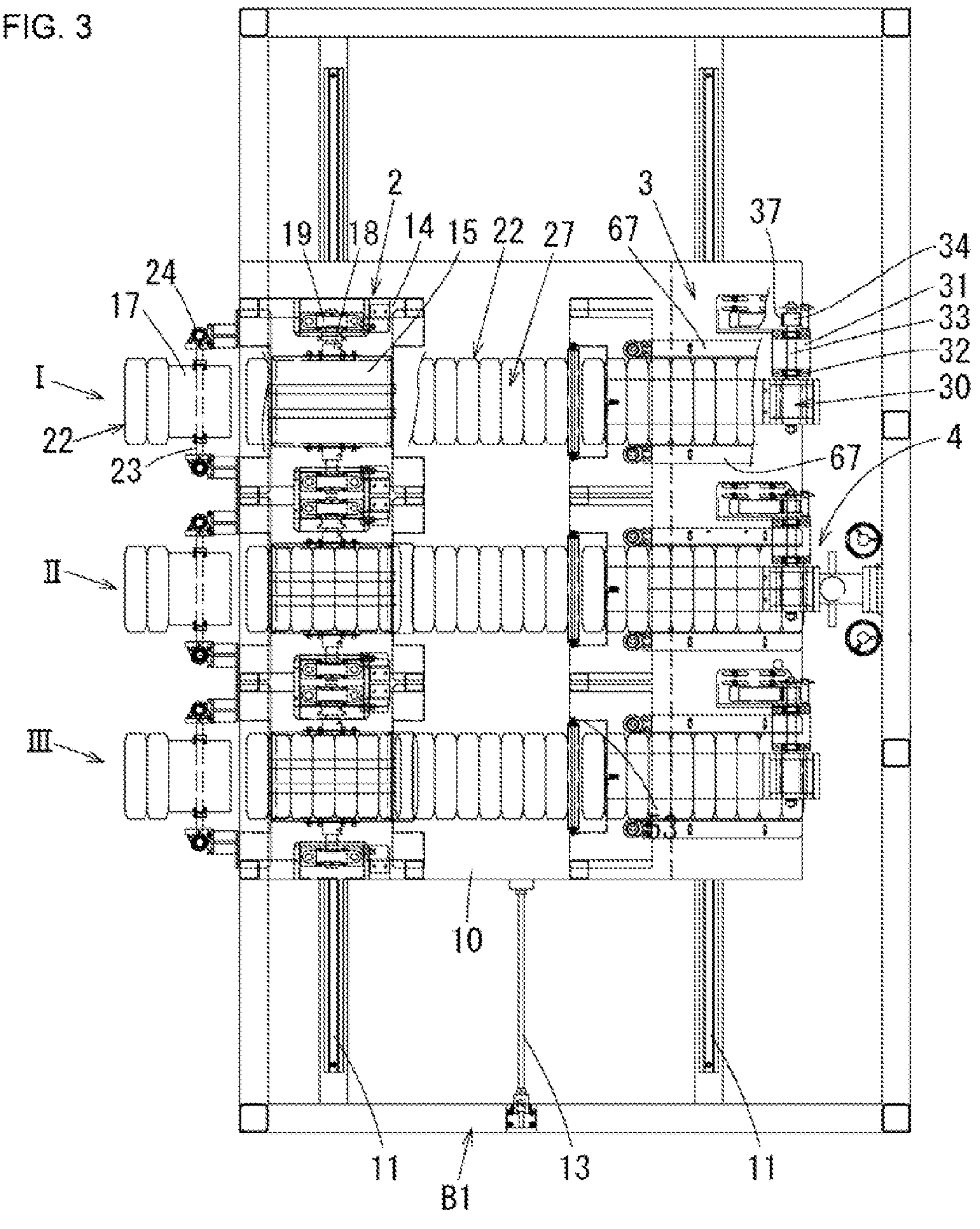
FIG. 3 is a top view showing the outline of a row-of-pocket-coil-springs stock mechanism and a row-of-pocket-coil-springs delivery mechanism of the pocket coil spring structure assembling apparatus according to the present invention.
Figure 4:
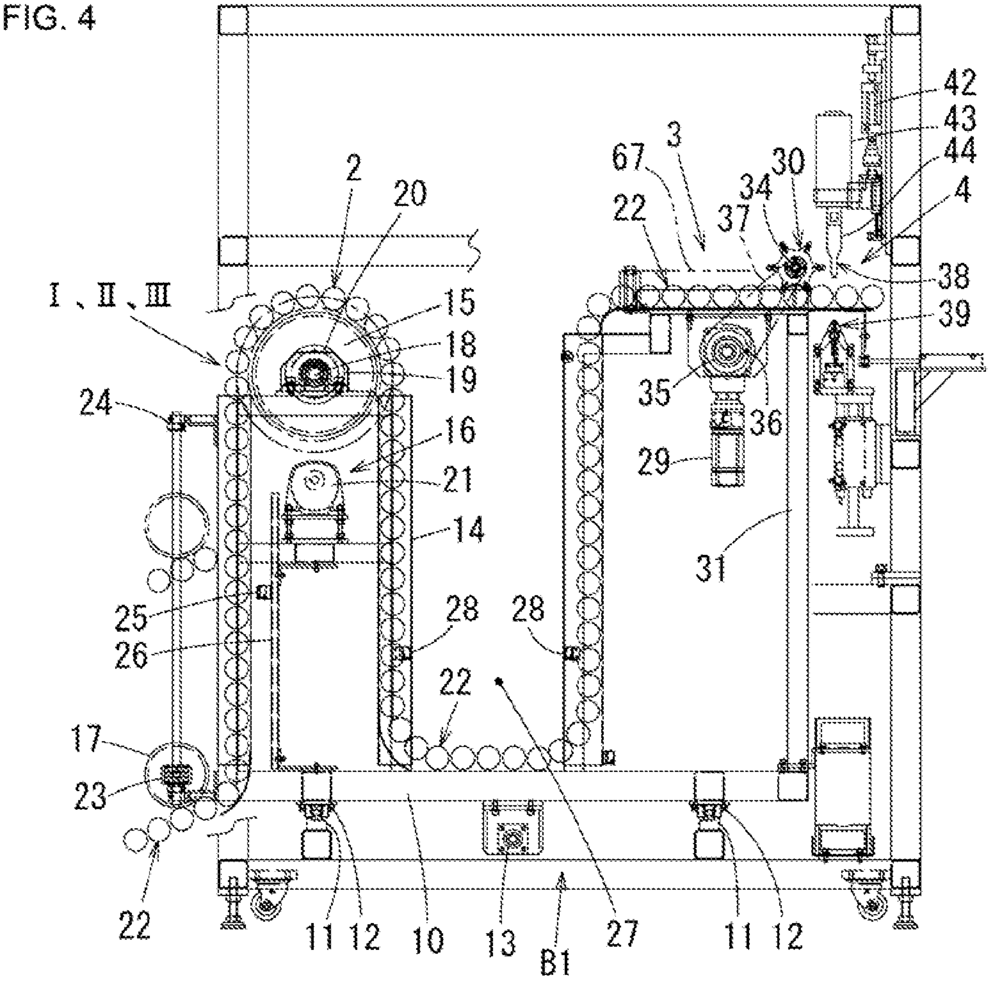
FIG. 4 is a front view showing the outline of the row-of-pocket-coil-springs stock mechanism and the row-of-pocket-coil-springs delivery mechanism of the pocket coil spring structure assembling apparatus according to the present invention.

As shown in FIG. 2, FIG. 3, and FIG. 4, the row-of-pocket-coil-springs auxiliary feed stock mechanism 2 and the row-of-pocket-coil-springs delivery mechanism 3 are disposed such that one mechanism part of the mechanism 2 and one mechanism part of the mechanism 3 are connected to each other in series, and row-of-pocket-coil-springs supply units I, II, III are attached to a movable base 10.

The movable base 10 is placed on sliders 12 received by a pair of slide rails 11, respectively, that extend between the front and the rear of the first base frame B1, so that any one of the row-of-pocket-coil-springs supply units I, II, and III can be selectively moved to a position facing the sealing/cutting mechanism 4 quickly by a two-stage cylinder 13 attached to the undersurface of the movable base 10.

Each of the row-of-pocket-coil-springs supply units I, II, and III consisting of the row-of-pocket-coil-springs auxiliary feed stock mechanism 2 and the row-of-pocket-coil-springs delivery mechanism 3 has the same structure, and therefore only the row-of-pocket-coil-springs supply unit I will be described.

The row-of-pocket-coil-springs auxiliary feed stock mechanism 2 of the row-of-pocket-coil-springs supply unit I is composed of a feed roller 15 supported by a support stand 14 erected on the movable base 10, a driving unit 16 that drives the feed roller 15, and a dancing roller 17 disposed on the upstream side with respect to the feed roller 15.

The feed roller 15 has a shaft 18 which serves as its shaft center and both ends of which are supported by a pillow block 19 attached to the support stand 14. A sprocket 20 attached to the shaft 18 is rotationally driven by a sprocket (not shown) of a motor 21 disposed below by means of a chain (not shown).

The driving unit 16 is provided to rotationally drive the feed roller 15 and the chain extended between the sprocket 20 and the sprocket of the motor 21 (see FIG. 4).

A wire fillet used to hold and feed a nonwoven fabric part of a row of pocket coil springs 22 formed by putting a coil spring into each pocket made of a nonwoven fabric and arranging the resulting pocket coil springs in a row is planted in a roll surface forming the surface of the feed roller 15.

The dancing roller 17 is used to detect a shortage of a row of pocket coil springs 22 fed by the feed roller 15. The dancing roller 17 has its shaft parts 23 that protrude from both ends of the dancing roller 17 and that are attached to a guide 24 provided on the side surface of the support stand 14 so that the shaft parts 23 can move upwardly and downwardly. A sensor 25 is attached to a set bar 26 erected on the movable base 10 so that the height position of the sensor 25 can be changed, and, when the dancing roller 17 rises near the upper end of the guide 24, i.e., when there is a possibility that the supply of a row of pocket coil springs 22 will become insufficient, the sensor 25 detects this shortage.

In other words, when the supply of a row of pocket coil springs 22 is insufficient, the dancing roller 17 is raised upwardly by a row of pocket coil springs 22, and, when the sensor 25 reaches an off state, the motor 21 stops its rotation, and, when a row of pocket coil springs 22 are supplied, the dancing roller 17 is lowered, and, as a result, the sensor 25 reaches an on state, so that the motor 21 can be rotated.

When the motor 21 is rotated, a row of pocket coil springs 22 are sent to a stock space 27 between the row-of-pocket-coil-springs auxiliary feed stock mechanism 2 and the row-of-pocket-coil-springs delivery mechanism 3.

When a predetermined amount of a row of pocket coil springs 22 are gathered in the stock space 27, the sensor 28 disposed in a supply path detects this state, and, as a result, the motor 21 stops, so that the supply of a row of pocket coil springs 22 to the stock space 27 is stopped.

Therefore, a certain amount of a row of pocket coil springs 22 fed by a feed cam 30 of the sealing/cutting mechanism 4 described later are stocked in the stock space 27 between the row-of-pocket-coil-springs auxiliary feed stock mechanism 2 and the row-of-pocket-coil-springs delivery mechanism 3.

The stock space 27 can stock a row of pocket coil springs 22 having a greater length than a row of pocket coil springs having a length corresponding to an amount once processed by the pressure bonding mechanism 7 described later.

As shown in FIG. 1 and FIG. 4, the row-of-pocket-coil-springs delivery mechanism 3 is driven by a servo motor 29 at a timing, and is composed of a pair of conveying belts 67 that hold a row of pocket coil springs 22 while pressing these coil springs from both sides thereof in a state in which the central axis of a row of pocket coil springs 22 is placed horizontally, and the feed cam 30 that rotates at a timing with respect to the conveying belt 67.

The feed cam 30 is formed in a U-shaped groove substantially coinciding with the radius shape of a pocket coil spring, when viewed sidewardly, around a shaft 33 both ends of which are rotatably supported by pillow blocks 32 at an upper part of a sending stand 31 disposed on the movable base 10.

A timing pulley 34 attached to the shaft 33 is rotated by allowing the rotation of a driving pulley 36, which is rotated while decelerating the rotation of the servomotor 29 by means of a decelerator 35, to be transmitted by use of a timing belt 37.

Accordingly, a row of pocket coil springs 22 having a length (which is measured based on the number of pocket coil springs) predetermined by the control apparatus 9 are fed from the subsequent sealing/cutting mechanism 4 to the row-of-pocket-coil-springs conveying mechanism 5, the melt application mechanism 6, and the pressure bonding mechanism 7 that are disposed in the second base frame B2.

The sealing/cutting mechanism 4 is structured substantially in the same way as the mechanism disclosed in Japanese Patent Laid-Open Publication No. 2007-45518 previously proposed by the present applicant.

In more detail, as shown in FIG. 1, FIG. 2, and FIG. 4, the sealing/cutting mechanism 4 is disposed immediately behind the feed cam 30 of the row-of-pocket-coil-springs delivery mechanism 3 at the center position of the conveying belt 51 of the row-of-pocket-coil-springs conveying mechanism 5 consisting of two conveying belts 51 that press a row of pocket coil springs 22 from both sides thereof.

Figure 5:
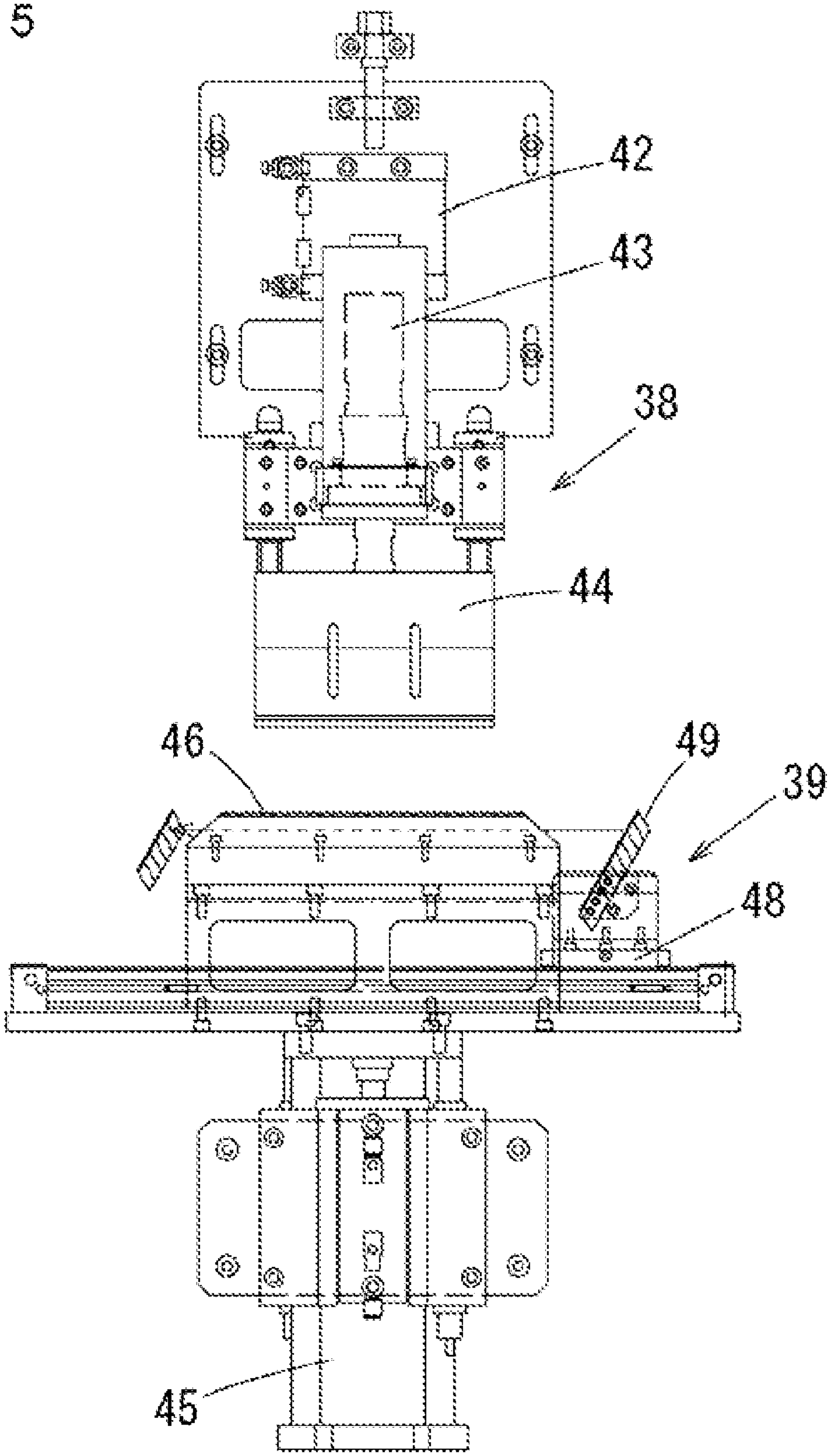
FIG. 5 is a side view of a sealing/cutting mechanism of the pocket coil spring structure assembling apparatus according to the present invention.
Figure 6:
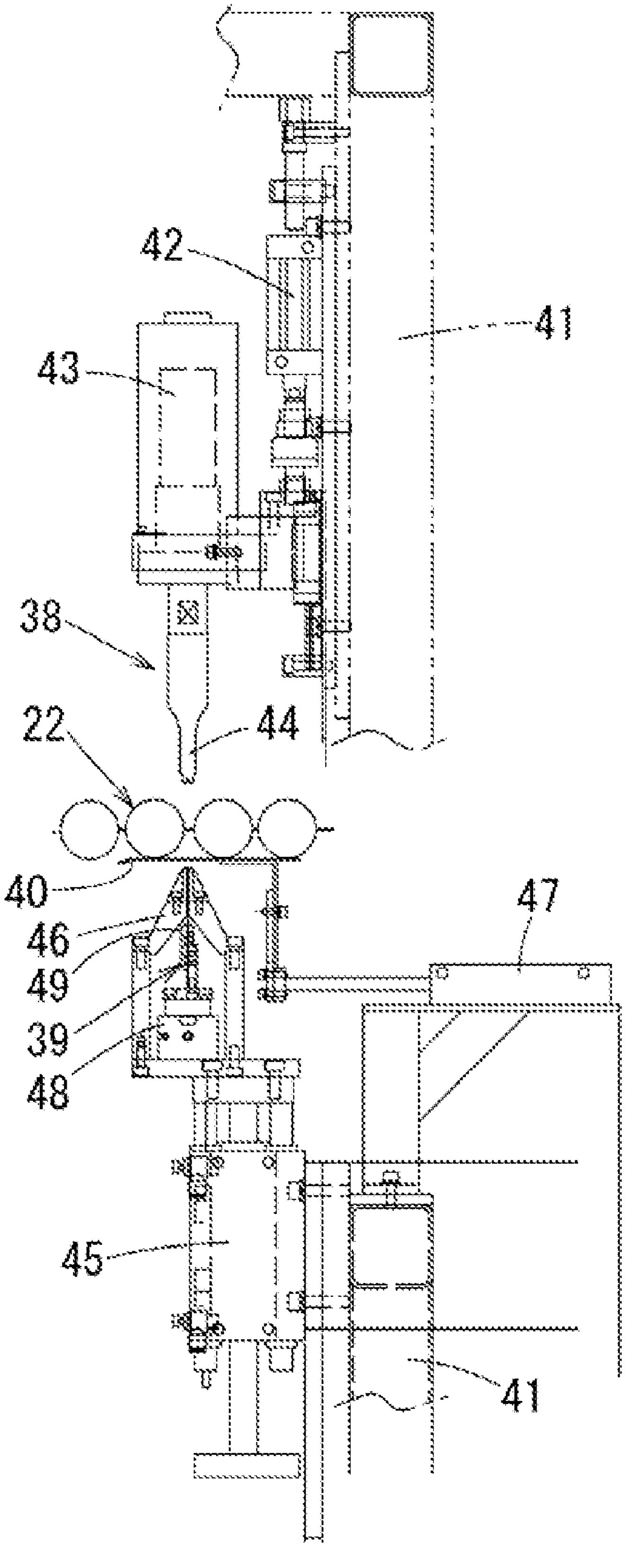
FIG. 6 is a front view of the sealing/cutting mechanism of the pocket coil spring structure assembling apparatus according to the present invention.

Additionally, as shown in FIG. 5 and FIG. 6, the sealing/cutting mechanism 4 consists of a sealing section 38 and a cutting section 39 disposed below the sealing section 38. The sealing section 38 is composed of a shutter 40 movable rightwardly and leftwardly in the figure by means of a opening/closing cylinder 47, a cylinder 42 attached to a part of a side support pillar 41 of the movable base 10 above a row of pocket coil springs 22 placed on the shutter 40, an ultrasonic generator 43 that is raised and lowered by the cylinder 42, and a horn 44 attached to the lower end of the ultrasonic generator 43.

The cutting section 39 is composed of a cylinder 45 attached to apart of the right support pillar 41 of the first base frame B1 and a cutter 49 that performs cutting and separation while running in a direction perpendicular to the supply direction of a row of pocket coil springs 22 through the center of an anvil 46 having a dual-partitioning form that is raised and lowered by the cylinder 45.

In FIG. 5 and FIG. 6, the horn 44 is in a rising state, the anvil 46 is in a descending state, and the shutter 40 is in a closed state, so that a row of pocket coil springs 22 become ready to be conveyed. The horn 44 for ultrasonic welding is structured to be raised and lowered by the cylinder 42 by about ½ or more of the coil spring body diameter, where the anvil 46 is structured to be raised and lowered by the cylinder 45 by about ½ or more of the coil spring body diameter.

The row of pocket coil springs 22 having a length predetermined by the control apparatus 9 are sent and stopped by means of the row-of-pocket-coil-springs delivery mechanism 3 and the row-of-pocket-coil-springs conveying mechanism 5. Then the shutter 40 is opened by the operation of the opening/closing cylinder 47.

When the shutter 40 is opened, the horn 44 is lowered by the cylinder 42, and the anvil 46 is raised by the cylinder 45, so that a row of pocket coil springs 22 are placed between the horn 44 of the sealing section 38 and the anvil 46, and a nonwoven fabric of the row of pocket coil springs 22 is welded while oscillating ultrasonic waves.

After the nonwoven fabric of a row of pocket coil springs 22 is welded, the cutter 49 attached to a cutter sliding cylinder 48 cuts and separates the intermediate part of the welded nonwoven fabric while running in the direction perpendicular to the supply direction of a row of pocket coil springs 22 as mentioned above.

Thereafter, the horn 44 is raised, and the anvil 46 is lowered, and the shutter 40 is closed, so that a row of pocket coil springs 22 become ready to be conveyed.

Figure 7:
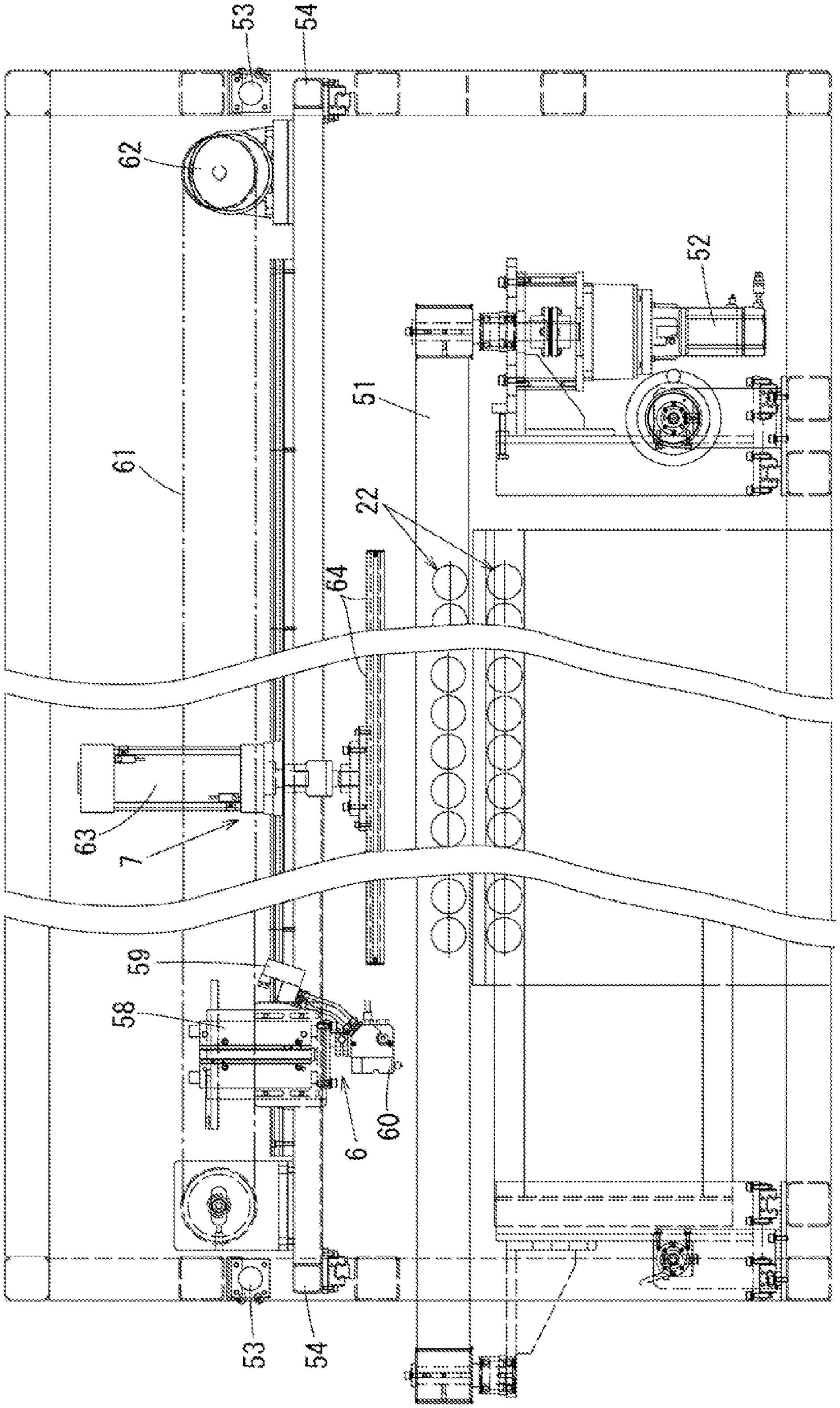
FIG. 7 is a front view showing the outline of a row-of-pocket-coil-springs conveying mechanism, a melt application mechanism, and a pressure bonding mechanism of the pocket coil spring structure assembling apparatus according to the present invention.

As shown in FIG. 2 and FIG. 7, the row-of-pocket-coil-springs conveying mechanism 5 has the pair of conveying belts 51 disposed front and rear at the intermediate height position of the second base frame B2.

The conveying belt 51 has its one end driven by a drive motor 52 for conveyance, so that a row of pocket coil springs supplied from the row-of-pocket-coil-springs delivery mechanism 3 are conveyed.

A row of pocket coil springs 22 are fed until this row of pocket coil springs 22 have a predetermined length by measuring the number of coil springs fed by the feed cam 30 of the row-of-pocket-coil-springs delivery mechanism 3.

A row of pocket coil springs 22 fed in this way are conveyed in a state of being interposed between the conveying belts 51 of the row-of-pocket-coil-springs conveying mechanism 5, and, when a predetermined number is reached, the conveying belts 51 and the row-of-pocket-coil-springs delivery mechanism 3 are temporarily stopped.

Thereafter, the sealing/cutting mechanism 4 is actuated, and a predetermined number of pocket coil springs 22 are sealed, and the intermediate part of the sealed pocket coil springs is cut by the cutter 49. Thereafter, the conveying belts 51 of the row-of-pocket-coil-springs conveying mechanism 5 are driven, and a row of pocket coil springs 22 obtained by separation are conveyed to a predetermined position, and the operation of the pressure bonding mechanism 7 is awaited.

The melt application mechanism 6 and the pressure bonding mechanism 7 are structured as shown in FIG. 7 to FIG. 12.

In detail, an underframe 54 that is slidable back and forth by means of a switching drive cylinder 53 (see FIG. 8) is disposed above the conveying belts 51 disposed at the intermediate height position of the second base frame B2, and a beam 55 for supporting the melt application mechanism and a beam 56 for supporting the pressure bonding mechanism are disposed so as to extend in the rightward-leftward direction of the underframe 54 (in the frontward-rearward direction in FIG. 8 to FIG. 12).

The melt application mechanism 6 is disposed on the beam 55 for supporting the melt application mechanism, and the pressure bonding mechanism 7 is disposed on the beam 56 for supporting the pressure bonding mechanism.

The melt application mechanism 6 has a slide rail 57 disposed on the upper surface of the beam 55 for supporting the melt application mechanism. A plurality of coating heads 60 opened and closed by a solenoid 59 (see FIG. 7) is attached to the lower end of a raising/lowering cylinder 58 (i.e., the lower end of a piston rod) that slides on the slide rail 57 rightwardly and leftwardly (i.e., in the front-back direction perpendicular to the sheet of the figure).

The raising/lowering cylinder 58 raises and lowers the coating head 60 so that the coating head 60 comes into contact with or separates from the upper surface of a row of pocket coil springs 22 conveyed by the conveying belt 51.

In other words, when an application driving belt 61 extending between the right and the left of the second base frame B2 is driven by an application driving motor 62, the raising/lowering cylinder 58 expands, and the coating heads 60 located at the lower end of the cylinder 58 descend so as to approach the upper surface of a row of pocket coil springs 22 conveyed by the conveying belt 51, and move in the front-back direction in the figure while ejecting an adhesive continuously or intermittently.

The pressure bonding mechanism 7 disposed on the beam 56 for supporting the pressure bonding mechanism has a pressure bonding plate 64 attached to the lower end of a pressure bonding cylinder 63 (i.e., the lower end of a piston rod), and the pressure bonding plate 64 downwardly pushes a row of pocket coil springs 22 conveyed by the conveying belt 51 over substantially the whole length of the pocket coil springs.

Figure 8:
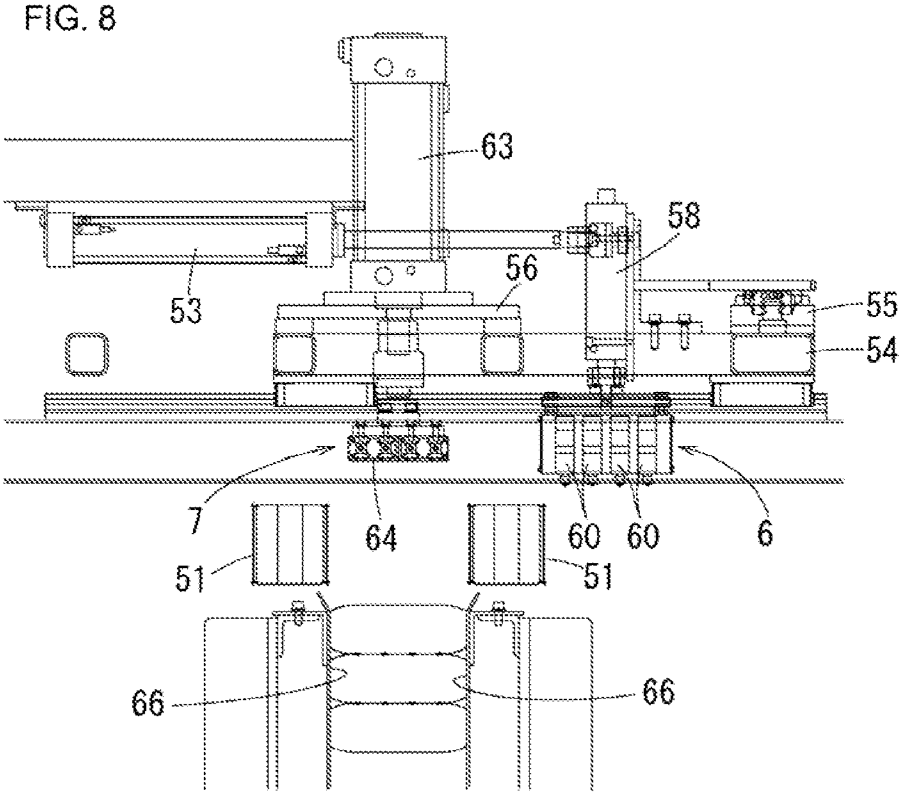
FIG. 8 is a side view showing the outline of the row-of-pocket-coil-springs conveying mechanism, the melt application mechanism, the pressure bonding mechanism, and a holding mechanism of the pocket coil spring structure assembling apparatus according to the present invention, and showing an original position state.

The underframe 54 is moved by the switching drive cylinder 53, so that either the melt application mechanism 6 or the pressure bonding mechanism 7 is located above a row of pocket coil springs 22 conveyed by the conveying belt 51 (see FIG. 7 and FIG. 8).

The control apparatus 9 drives the pocket coil spring structure assembling apparatus 1 by totally controlling the row-of-pocket-coil-springs auxiliary feedstock mechanism 2, the row-of-pocket-coil-springs delivery mechanism 3, the sealing/cutting mechanism 4, the row-of-pocket-coil-springs conveying mechanism 5, the melt application mechanism 6, the pressure bonding mechanism 7, and the applicator 8. The control operation performed by the control apparatus 9 includes the following process.

In detail, when one of the row-of-pocket-coil-springs supply units I, II, and III that is being used is changed, e.g., when the row-of-pocket-coil-springs supply unit I is changed, the process has a detection step of detecting the other row-of-pocket-coil-springs supply units II and III being in anon state of the sensor 28 showing that a predetermined amount of a row of pocket coil springs 22 are stocked in the stock space 27 from the row-of-pocket-coil-springs supply units II and III, a step of specifying the row-of-pocket-coil-springs supply unit II or the row-of-pocket-coil-springs supply unit III that is nearest to the sealing/cutting mechanism 4 of the row-of-pocket-coil-springs supply units II and III detected at the above step, and a step of outputting a signal, according to which the row-of-pocket-coil-springs supply unit II or III specified at the above step is moved to a part of the sealing/cutting mechanism 4, to the switching drive cylinder 53.

The pocket coil spring structure assembling apparatus 1 according to the present invention is structured as above, and therefore when the pocket coil spring structure assembling apparatus 1 is operating while using the row-of-pocket-coil-springs supply unit I among the row-of-pocket-coil-springs supply units I, II, and III at the present time, if the control apparatus 9 detects the possibility that a shortage of supply will be caused from the fact that a supply amount of a row of pocket coil springs 22 is insufficient with the following processing speed through the sensor 28 of the stock space 27, the position of the dancing roller 17 of the other row-of-pocket-coil-springs supply units II and III and the amount of a row of pocket coil springs 22 to be stocked in the stock space 27 are detected.

At this time, if the control apparatus 9 detects that both of the row-of-pocket-coil-springs supply units II and III have a sufficient stock amount in the stock space 27, the row-of-pocket-coil-springs supply unit II located near is specified as a row-of-pocket-coil-springs supply unit to be targeted, and, if the row-of-pocket-coil-springs supply unit II has an insufficient stock amount of a row of pocket coil springs 22 in the stock space 27, the row-of-pocket-coil-springs supply unit III is specified as a row-of-pocket-coil-springs supply unit to be targeted.

When the row-of-pocket-coil-springs supply unit II or III is specified, the switching drive cylinder 53 is actuated according to a signal output from the control apparatus 9, and the specified row-of-pocket-coil-springs supply unit II or III is moved to a position facing the sealing/cutting mechanism 4 while moving the movable base 10.

Accordingly, the pocket coil spring structure assembling apparatus 1 is continuously operated, and therefore it is possible to almost completely eliminate the disadvantage of stopping the operation of the pocket coil spring structure assembling apparatus 1.

Figure 9:
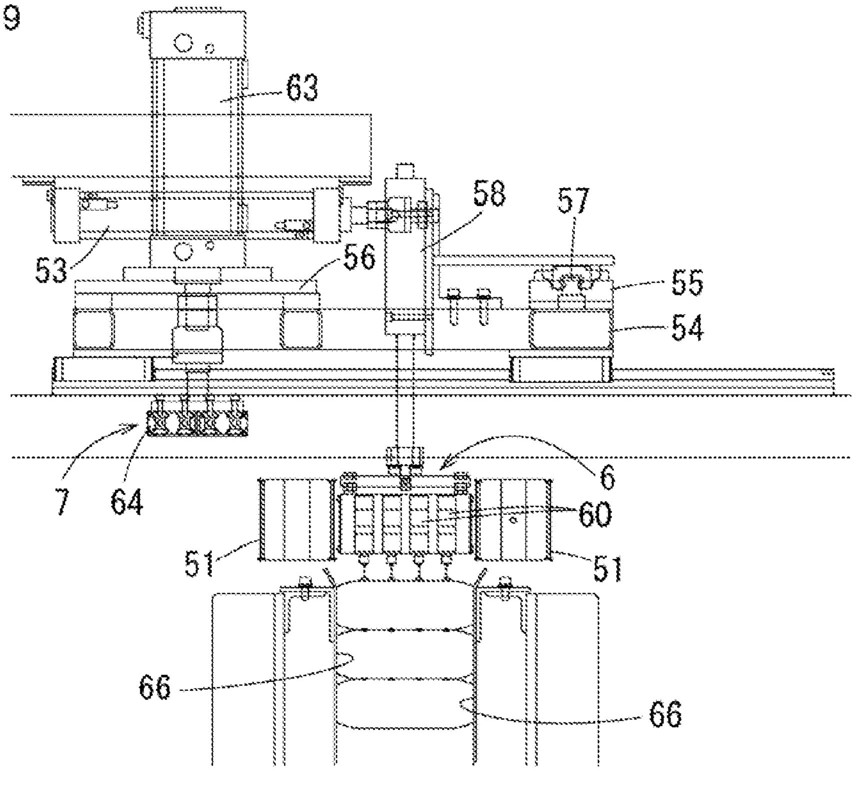
FIG. 9 is a side view showing an operational state of the melt application mechanism of the pocket coil spring structure assembling apparatus according to the present invention.

Accordingly, when a row of pocket coil springs 22 are continuously moved to a predetermined position by means of the conveying belt 51 and are stopped there, the raising/lowering cylinder 58 expands, and the coating heads 60 are lowered to approach a row of pocket coil springs 22 as shown in FIG. 9. Thereafter, a valve is opened by the solenoid 59, and an adhesive that is supplied from the applicator starts to be ejected, and, in this state, the coating heads 60 are moved in the longitudinal direction of a row of pocket coil springs 22, so that an adhesive is applied onto the row of pocket coil springs 22.

When the adhesive is applied, the raising/lowering cylinder 58 contracts, and the coating heads 60 rise and recede from the row of pocket coil springs 22. Thereafter, as shown in FIG. 10, the switching drive cylinder 53 moves the underframe 54, and allows the pressure bonding mechanism 7 to be located above the row of pocket coil springs 22.

Figure 10:
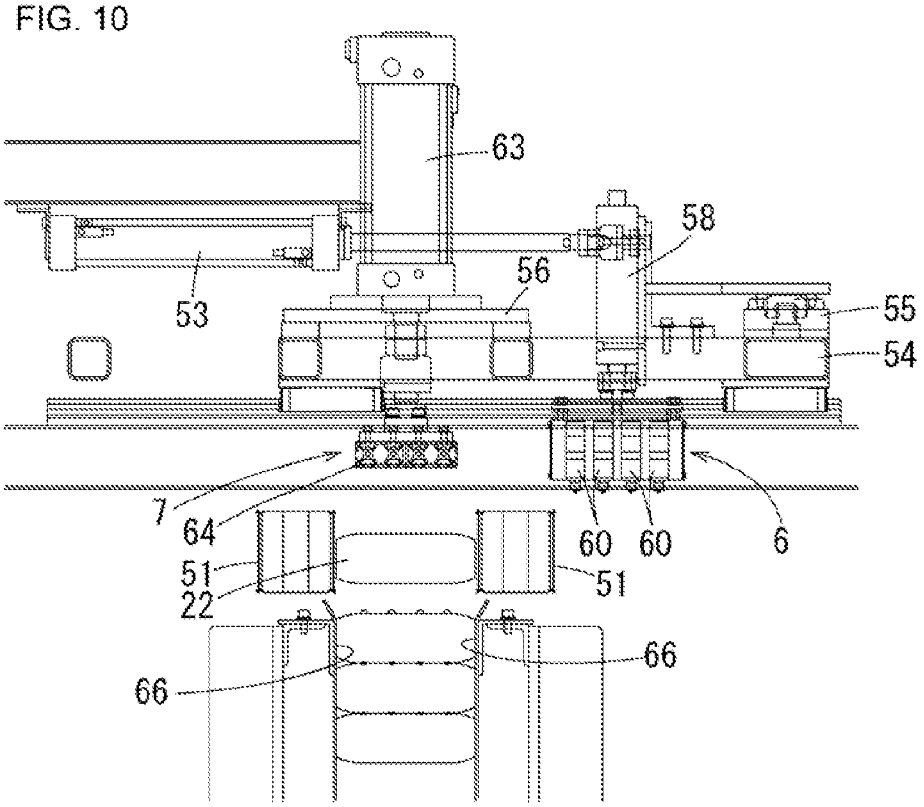
FIG. 10 is a side view showing a state in which the row-of-pocket-coil-springs conveying mechanism of the pocket coil spring structure assembling apparatus according to the present invention is conveying a row of pocket coil springs.
Figure 11:
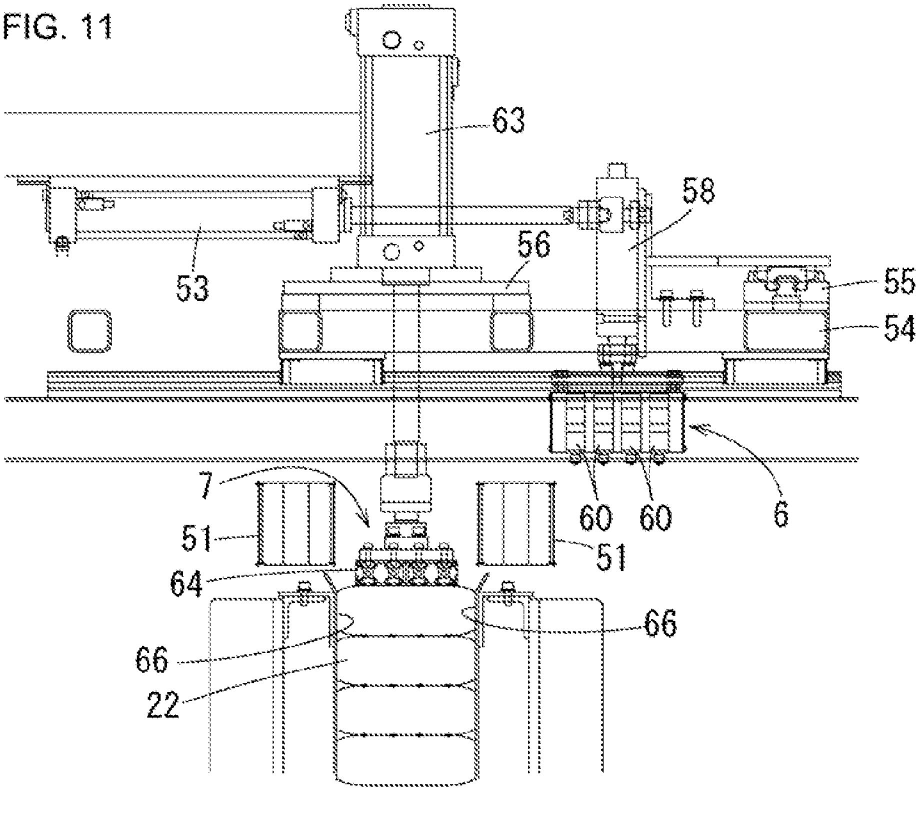
FIG. 11 is a side view showing a state in which the pressure bonding mechanism of the pocket coil spring structure assembling apparatus according to the present invention presses and bonds a row of pocket coil springs together.

When the pressure bonding mechanism 7 is located above the row of pocket coil springs 22, the pressure bonding cylinder 63 expands, and the pressure bonding plate 64 descends as shown in FIG. 10 and FIG. 11, so that the row of pocket coil springs 22 held between the pair of conveying belts 51 are pressed downwardly, and are pressed against and bonded with a row of pocket coil springs 22 that are located therebelow held by a pair of holding plates 66, and onto which an adhesive has been already applied.

Figure 12:
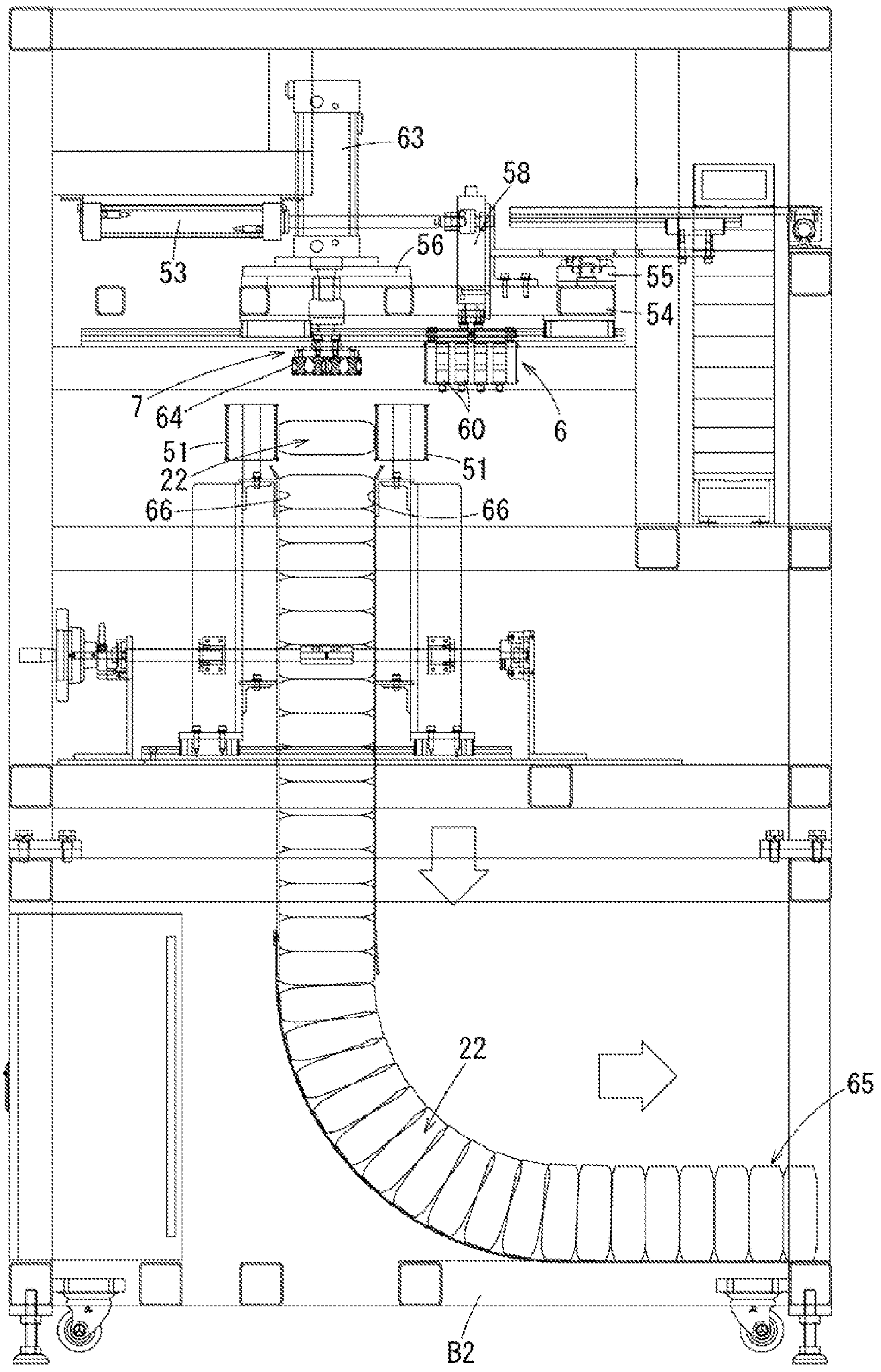
FIG. 12 is a side view showing the outline of the row-of-pocket-coil-springs conveying mechanism, the melt application mechanism, and the pressure bonding mechanism according to the present invention.

A pocket coil spring structure 65 shown in FIG. 12 and FIG. 2 is formed by repeatedly performing this process a predetermined number of times.

In the above description, three row-of-pocket-coil-springs supply units are used, i.e., the row-of-pocket-coil-springs supply units I, II, and III are used. However, the present invention is not limited to this, and two row-of-pocket-coil-springs supply units may be alternately used, or four or more row-of-pocket-coil-springs supply units may be used.

Additionally, if a plurality of row-of-pocket-coil-springs supply units are provided, the present invention is not limited to those supply units having the same spring constant as in the above description. If the row-of-pocket-coil-springs supply units I, II, and III differ from each other in spring wire diameter, in the number of active coils, or in average coil diameter, the pocket coil spring assembly structure 65 having parts differing in hardness can be produced by supplying the row-of-pocket-coil-springs supply units I, II, and III to the conveying mechanism while appropriately repeating or changing these supply units.

The pocket coil spring structure assembling apparatus 1 according to the present invention is not limited to be used for a pocket coil spring structure for beds, but can also be used for assembling a pocket coil spring structure for chairs or sofas.

What is claimed is:

1. A pocket coil spring structure assembling apparatus that assembles a plurality of rows of pocket coil springs into a mat-like pocket coil spring structure such that one coil spring is contained in one pocket that is made of sheet material having air permeability and that is formed in a continuous cylindrical shape like a pocket, thereafter a row of pocket coil springs are successively arranged in a row, and a plurality of rows of pocket coil springs are bonded together, the pocket coil spring structure assembling apparatus comprising:

a row-of-pocket-coil-springs auxiliary feed stock mechanism;

a row-of-pocket-coil-springs delivery mechanism that is provided to deliver a row of a predetermined number of pocket coil springs;

a sealing/cutting mechanism that seals and separates a row of pocket coil springs that have been delivered from the row-of-pocket-coil-springs delivery mechanism and that have a predetermined length;

a row-of-pocket-coil-springs conveying mechanism having a pair of conveying belts arranged so as to oppose each other in a horizontal direction, wherein the row-of-pocket-coil-springs conveying mechanism holds a row of pocket coil springs that have been cut between the pair of conveying belts with a central axis of each pocket coil spring extending in the horizontal direction and conveys the row of pocket coil springs that have been cut to a predetermined position;

a melt application mechanism that applies an adhesive to a row of pocket coil springs that have been conveyed by the row-of-pocket-coil-springs conveying mechanism;

a pressure bonding mechanism that presses a next row of pocket coil springs conveyed by the row-of-pocket-coil-springs conveying mechanism against the row of pocket coil springs to which an adhesive has been applied;

an applicator mechanism that supplies an adhesive to the melt application mechanism; and a control apparatus that controls each of the mechanisms;

wherein the row-of-pocket-coil-springs auxiliary feed stock mechanism and the row-of-pocket-coil-springs delivery mechanism are connected together in series so as to form a plurality of row-of-pocket-coil-springs supply units, the plurality of row-of-pocket-coil-springs supply units are disposed on an upstream side with respect to the sealing/cutting mechanism, the control apparatus alternatively selects a row-of-pocket-coil-springs supply unit to face the sealing/cutting mechanism from the plurality of row-of-pocket-coil-springs supply units, and a row-of-pocket-coil-springs supply unit alternatively selected is moved to face the sealing/cutting mechanism.

2. The pocket coil spring structure assembling apparatus of claim 1, wherein the row-of-pocket-coil-springs auxiliary feed stock mechanism includes therein a stock space structured so as to stock a row of pocket coil springs having a greater length than a row of pocket coil springs having at least a length processed by the pressure bonding mechanism.

3. The pocket coil spring structure assembling apparatus of claim 1, wherein the row-of-pocket-coil-springs auxiliary feed stock mechanism includes an auxiliary feed roller, and wherein a wire fillet is disposed on a row-of-pocket-coil-springs contact surface of the auxiliary feed roller.

4. The pocket coil spring structure assembling apparatus of claim 1, wherein the row-of-pocket-coil-springs delivery mechanism includes a feed cam having a U groove, and wherein a shape of the U groove of the feed cam is formed in a dual-partitioning shape having substantially the same diameter as a body diameter of a pocket coil spring.

5. The pocket coil spring structure assembling apparatus of claim 1, wherein the sealing/cutting mechanism includes a horn and an anvil for ultrasonic welding, the horn and the anvil being structured to be raised and lowered by about ½ or more of a body diameter of a pocket coil spring.

6. The pocket coil spring structure assembling apparatus of claim 5, wherein the anvil for ultrasonic welding of the sealing/cutting means is divided into two parts, and is laid in a state in which a cutter knife can move through a center between the divided two parts.

7. The pocket coil spring structure assembling apparatus of claim 1, wherein the row-of-pocket-coil-springs delivery mechanism includes a pair of conveying belts, the row-of-pocket-coil-springs delivery mechanism being structured to convey a row of pocket coil springs to a predetermined position while interposing the row of pocket coil springs between the pair of conveying belts in a state of making a central axis of the pocket coil springs horizontal.

8. The pocket coil spring structure assembling apparatus of claim 1, further comprising:

a pair of holding plates arranged to hold the row of pocket coil springs that have been conveyed by the row-of-pocket-coil-springs conveying mechanism, wherein the melt application mechanism includes a coating head, and wherein the melt application mechanism is structured to move and apply a hot melt as the adhesive onto an upper surface of a row of pocket coil springs held by the pair of holding plates while the coating head used to apply the hot melt is moved and lowered from a standby position to the upper surface of the row of pocket coil springs held by the holding plates.

9. The pocket coil spring structure assembling apparatus of claim 8, wherein the pressure bonding mechanism is structured to press the next row of pocket coil springs conveyed by the pair of conveying belts of the row-of-pocket-coil-springs conveying mechanism onto the row of pocket coil springs held by the holding plates.

* * * * *